United States Patent
Goldstein et al.

(10) Patent No.: US 11,546,393 B2
(45) Date of Patent: Jan. 3, 2023

(54) SYNCHRONIZED PERFORMANCES FOR REMOTELY LOCATED PERFORMERS

(71) Applicants: Mark Goldstein, San Francisco, CA (US); Michael Mcnabb, San Francisco, CA (US); Boris Smus, Seattle, WA (US)

(72) Inventors: Mark Goldstein, San Francisco, CA (US); Michael Mcnabb, San Francisco, CA (US); Boris Smus, Seattle, WA (US)

(*) Notice: Subject to any disclaimer, the term of this patent is extended or adjusted under 35 U.S.C. 154(b) by 0 days.

(21) Appl. No.: 17/373,577

(22) Filed: Jul. 12, 2021

(65) Prior Publication Data

US 2022/0014570 A1 Jan. 13, 2022

Related U.S. Application Data

(60) Provisional application No. 63/050,217, filed on Jul. 10, 2020.

(51) Int. Cl.
*H04L 65/403* (2022.01)

(52) U.S. Cl.
CPC .................... *H04L 65/403* (2013.01)

(58) Field of Classification Search
CPC ..................................... H04L 65/403
USPC ............................ 709/204; 700/94
See application file for complete search history.

(56) References Cited

U.S. PATENT DOCUMENTS

| 7,714,222 | B2 | 5/2010 | Taub et al. | |
|---|---|---|---|---|
| 7,853,342 | B2* | 12/2010 | Redmann | G10H 7/00 700/94 |
| 9,661,043 | B2 | 5/2017 | Walker et al. | |
| 2006/0224261 | A1* | 10/2006 | Asada | H04H 60/04 700/94 |
| 2006/0224262 | A1* | 10/2006 | Asada | H04H 60/04 700/94 |
| 2009/0129753 | A1 | 5/2009 | Wagenlander | |
| 2012/0050456 | A1* | 3/2012 | Arnao | H04N 7/152 348/E7.083 |

* cited by examiner

*Primary Examiner* — Zi Ye
(74) *Attorney, Agent, or Firm* — Canady & Lortz LLP; Bradley K. Lortz

(57) ABSTRACT

A system for producing a live performance combining separate performances of remote players comprises a plurality of connected computing devices transmitting a plurality of communication streams to one another in series. The system can employ the plurality of series conceded computing devices, each for receiving and playing back an immediate predecessor communication stream from an immediate predecessor computing device, and each for capturing and transmitting a current performance along with the played back immediate predecessor communication stream. Typically, the individual performances of remote players can comprise live instrument music and/or vocals which can also include live video.

15 Claims, 9 Drawing Sheets

SYNCHRONIZED PERFORMANCES FOR REMOTELY LOCATED PERFORMERS

CROSS-REFERENCE TO RELATED APPLICATIONS

This application claims the benefit under 35 U.S.C. § 119(e) of the following U.S. provisional patent application, which is incorporated by reference herein:

U.S. Provisional Patent Application No. 63/050,217 filed Jul. 10, 2020, by Goldstein et al. and entitled "SIGMA STREAMING."

BACKGROUND OF THE INVENTION

1. Field of the Invention

This invention relates to synchronized performances for remotely located performers. Particularly, this invention relates to synchronizing live performances including music combining separate individual performers.

2. Description of the Related Art

With the advent of popular video conferencing systems like Zoom, Skype, and Google Meet, people have been enjoying making group calls. But they have been frustrated when they attempt to sing together, because the traditional design of these systems imposes long and varying lag times between each person. Audio and video must make a round trip from person A to person B, and finally back to A. This makes it impossible for any two people, let alone a group of people, to synchronize their singing in time.

Applications like Jamkazam, Jamulus, and Jacktrip, and others, all attempt to provide groups of musicians the opportunity to play together in real time while minimizing the inevitable latency that occurs due to the physical distance between players. Such systems do this by optimizing the internet hardware and software, and fine-tuning the audio buffering parameters. Still, these programs cannot reduce point-to-point latency beyond the theoretical limit of the network to transport and relay data at the speed of light. Performance will degrade as the distance between players increases. There has been further development in the field related to synchronizing remotely connected users.

U.S. Pat. No. 7,714,222, issued May 11, 2010, by Taub et al., which is incorporated by reference herein, discloses methods, systems, and devices for collaborative handling of music contributions over a network. Embodiments of the invention provide a portal, the portal being accessible over the network by a plurality of workstations and configured to provide a set of editing capabilities for editing music elements. Music contributions may be received at the portal. At least a portion of the music contributions include music elements. In certain embodiments, the music elements have been deconstructed from an audio signal or a score image. A number of collaboration requests may be received at the portal over the network. Some collaboration requests may originate from a first workstation, while other collaboration requests may originate from a second workstation. In response to at least one of the collaboration requests, at least a portion of the music elements may be edited using the editing capabilities of the portal.

U.S. Pat. No. 9,661,043, issued May 23, 2021, by Walker et al., which is incorporated by reference herein, discloses packet rate control methods and related systems for interactive music systems. In certain embodiments, an interactive music client system combines captured audio data from audio inputs with audio input data from one or more peer interactive music client systems within an interactive music session and outputs the combined audio data to an audio output subsystem. The interactive music client system further determines performance parameters associated with the interactive music sessions and adjusts audio input/output packets based upon the performance parameters. The performance parameters can include, for example, session packet rates or other parameters. Adjustments can include aggregating audio frames, reducing packet rates, and adjusting audio frames within a jitter queue receive buffer. The jitter queue receive buffer, for example, can be adjusted so that is contents are reduced towards zero and/or to zero within a predetermined time duration. Other variations can also be implemented.

U.S Patent Publication No. 2009/0129753, published May 21, 2009, by Wagenlander, which is incorporated by reference herein, discloses an apparatus and method is provided for displaying components of a performance. The apparatus includes a computer and a time code generator in communication with the computer and selectively controlled by the computer to generate a time code signal. The system further comprises a digital video recorder with at least one output channel that each have respective video and audio outputs. The digital video recorder is in operable communication with the time code generator and responsive to the time code signal to output at least a portion of a first video component and a corresponding first audio component of the performance synchronized to the time code signal to a respective first video display and first audio amplifier.

U.S Patent Publication No. 2012/0050456, published Mar. 1, 2012, by Arnao et al., which is incorporated by reference herein, discloses a method in one example and includes receiving a first audio signal and a first video signal from a first network element. The method also includes adding a second audio signal to the first audio signal to generate a combined audio signal, where a second video signal is combined with the first video signal to generate a combined video signal. The first network element and the second network element reside in different geographic locations. The combined audio signal and the combined video signal is then transmitted to a next destination.

In view of the foregoing, there is a need in the art for improved systems and methods for synchronized performances among remotely located performers. Particularly, there is a need for systems and methods for synchronizing live performances including music combining separate individual performers at different locations. There is a need for such systems and methods to operate over the internet or any other networked system. These and other needs are met by the present invention as detailed hereafter.

SUMMARY OF THE INVENTION

A system for producing a live performance combining separate performances of remote players comprises a plurality of connected computing devices transmitting a plurality of communication streams to one another in series. The system can employ the plurality of series connected computing devices, each for receiving and playing back an immediate predecessor communication stream from an immediate predecessor computing device, and each for capturing and transmitting a current performance along with the played back immediate predecessor communication stream. Typically, the individual performances of remote players can comprise live instrument music and/or vocals which can also include live video.

A typical embodiment of the invention comprises a system for producing a live performance combining separate performances of remote players, including a plurality of connected computing devices transmitting a plurality of communication streams to one another in series having a first computing device for capturing a first performance and for transmitting a first communication stream including the first performance and one or more successor computing devices, each for receiving and playing back an immediate predecessor communication stream from an immediate predecessor computing device, and each for capturing and transmitting a current performance along with the played back immediate predecessor communication stream. A first one of the one or more successor computing devices receives the first communication stream from the first computing device as the immediate predecessor communication stream and the plurality of connected computing devices are remotely located from one another.

In further embodiments, a last computing device of the one or more successor computing devices for capturing a last communication stream (comprising a last performance, the first performance, any predecessor performances of any predecessor computing devices of the one or more successor computing devices in the series) can transmit the last performance to an audience. In addition, the immediate predecessor communication stream can include the first performance combined with any predecessor performances from any predecessor computing devices in the series of the one or more successor computing devices.

In some embodiments, the immediate predecessor communication stream can comprise audio of the first performance of the first computing device mixed with predecessor audio of any predecessor performances from any predecessor computing devices in the series of the one or more successor computing devices. The communication stream can further comprise video of at least one of the first performance of the first computing device and any predecessor performances from any predecessor computing devices in the series of the one or more successor computing devices.

In other embodiments, playing back the immediate predecessor communication stream and capturing the current performance along with the played back immediate predecessor communication stream can be performed simultaneously and mixed together.

Typically, the plurality of connected computing devices transmitting the plurality of communication streams to one another in series can be connected via one or more communication links. The one or more communication links can each comprise a unidirectional link or a bi-directional link. In addition, the one or more communication links can each comprise an internet communication link. A final combined performance can be transmitted from a last computing device of the one or more successor computing devices via a final communication link of the one or more of the communication links for playback to an audience. The final communication link can broadcast to a plurality of separate locations for playback of the final combined performance to the audience at all the separate locations.

In still other embodiments, capturing the current performance along with the played back immediate predecessor communication stream can comprise in-app mixing or open air mixing. Any of the described embodiments of the invention can be further modified consistent with any other feature or function from any other embodiment of the invention described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

Figure 1:
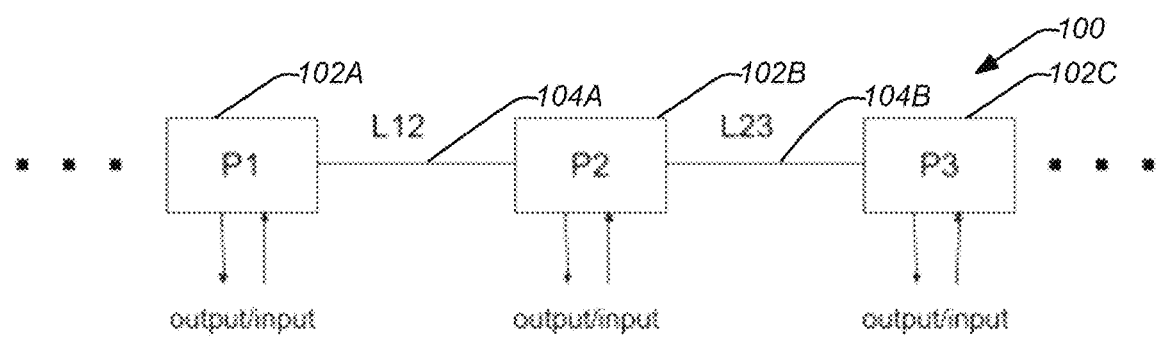
FIG. 1 is a block diagram showing how link L12 connects players P1 and P2 and link L23 connects players P2 and P3.

Embodiments of the present invention present a novel way to connect multiple participants (i.e. players or performers) using one or more computers into an online group so that they can interact with each other in a time-synchronous manner without regard to the latency between players. When the players are musicians, dancers, singers, or actors, for example, they can perform together in near real time. The performance could serve many purposes, such as a rehearsal, a class or private lesson. Embodiments of the invention permit unsynchronized interaction between the group members to facilitate all-way communication.

Synchronization is achieved by performing a serial daisy chain of overdub mixes. A player receives a media stream in real time and creates an "overdub" mix by performing along with the incoming stream as their "backing track." The newly mixed steam is passed on to the next player who adds their performance to it and passes their mix to the following player, and so on. There is no need to include timing data in the streams passed between players since the mixdown is done live at the time of each performance.

At every point in the chain the outgoing steam of each player is a synchronized performance of all the players up to that point. The last player's mix is the complete performance. A player can hear and/or see the performances of all the players preceding them in the chain; they cannot hear and/or see the performances of the players following them.

Embodiments of the invention also make it possible for players to perform before an audience, providing a shared experience that is highly valued by both players and audience and which is not comparable to watching a previously recorded performance.

As previously mentioned, U.S. Pat. No. 9,661,043, issued May 23, 2021, by Walker et al, discloses packet rate control methods and related systems for interactive music systems. The described system can capture audio input and send output packets to another location over a network. Received audio packets over the network are combined with audio input and playback. The local and remote streams are mixed to play back at the node. However, the mix is not sent back out to other players and each player will hear a mix with different offsets between players since each player receives a multitude of streams from the other players and the delays between each pairwise connection can be different. (Also, Walker et al. disclose that there is an upper limit to the allowable delay between players, beyond which the system will not provide acceptable results. Furthermore, this algorithm imposes processing costs that increase as more players are added to a session.)

In addition, U.S. Published Patent Application No. 2012/00504456, published Mar. 1, 2012, by Arnao et al, discloses a one-way daisy chain of super-imposed performances but does not teach mixing each player's simultaneous performance with the prior received performances. Instead, the system adds timing data to each new performance and adds it to an ever-increasing set of individual performances that is transmitted from node to node, where the performances are re-synchronized and remixed for playback at every node. (This is a more computationally complex algorithm that imposes processing and data costs that increase at each successive node in the chain.)

Embodiments of the present invention can employ in-node adjustment for round-trip audio latency offset. In addition, embodiments of the present invention can have the ability to use the communication chain bi-directionally and uni-directionally. Further, embodiments of the present invention can specify and change the order (sequential position) of the players. Also, embodiments of the present invention can employ loopback so the leader (first player) can hear the final mix.

2. Sequential Chain

An example system 100 comprises a plurality of remotely located players (participants or performers) 102A, 102B, 102C (which may be separated by great distances or merely separate rooms). Each player 102A, 102B, 102C comprises a computing device, e.g. personal computer or other generalized or specialized computing device, which operates to receive audio and/or video of the performer and then transmit that audio and/or video in a communication stream to the next player in the chain. Communication connection of the players 102A, 102B, 102C is organized in a chain as illustrated in the block diagram of FIG. 1. The chain comprises a set of nodes (such as P1, P2, and P3), one for each player 102A, 102B, 102C. Note that players and nodes may be interchangeably referenced as will be understood by those skilled in the art.

Each pair of sequential players 102A and 102B and 102B and 102C is connected with a communication link 104A, 104B, e.g. a network or internet connection or any suitable type of communication link for transmitting and receiving signals to and from the computing devices of each player 102A, 102B, 102C. Each particular link 104A, 104B can be readily identified by the letter "L" followed by the numbers identifying the two connected players. FIG. 1 shows, for example, how link L12 104A connects P1 and P2 and link L23 104B connects P2 and P3. Additional nodes and links can be added to the chain before P1 and after P3, as indicated.

Figure 2:
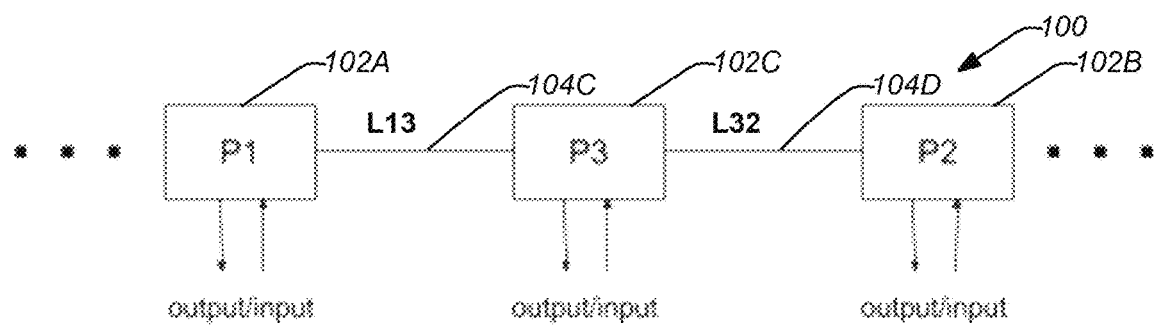
FIG. 2 is a block diagram showing how the links and players of FIG. 1 can be re-ordered.

The order of the players and their nodes can be readily varied. For example, by changing the connection between different players the nodes in FIG. 1 can be re-ordered as shown in FIG. 2 where P3 102C and P2 102B have switched places in the series. In this case, link L13 104C provides communication from P1 102A to P3 102C and link L32 104D provides communication from P3 102C to P2 102B.

The links 104A, 104B, 104C, 104D can provide one-way or two-way communication. They can carry any digital media data stream, such as audio, video or both. The data on a link 104A, 104B, 104C, 104D can be uncompressed or compressed, with lossy or lossless compression. The links 104A, 104B, 104C, 104D can be single or multi-channel. Some possible implementations of the links 104A, 104B, 104C, 104D include standard protocols such as UDP, RTC, HTTP, or TCP, services such as TURN, or apps such as Google Meet, Zoom, or Skype.

Each player 102A, 102B, 102C can send and receive media of the appropriate type, as indicated by the "output/input" labels. For a musical performance, each player can have an output such as a speaker or headphone and an input such as a microphone, a synth, an eclectic guitar, a mixer, or a digital audio workstation. Other implementations could use an input such as a camera and an output such as a display screen, with or without audio.

The devices connected to the input and output can be automatically assigned according to the system configuration on the player's machine. For example, the output can be sent to the built-in speaker, or headphones when they are plugged in. When alternative input and output devices are available, the player 102A, 102B, 102C can select which to use, such as when there are additional inputs and outputs from a USB interface, or a software driver such as BlackHole.

While all the nodes have the same internal structure and capabilities, nodes can be connected in at least the following different ways. In one case, the first node in a chain can employ a single outgoing link to the next node. In another case, the last node in a chain can have a single incoming link from the previous node. In yet another case, all other nodes in the chain can have an incoming link from the previous node and an outgoing link to the next node. The chain can run in at least three possible modes: synchronized, unsynchronized, and paused.

3. Synchronized Mode

Figure 3:
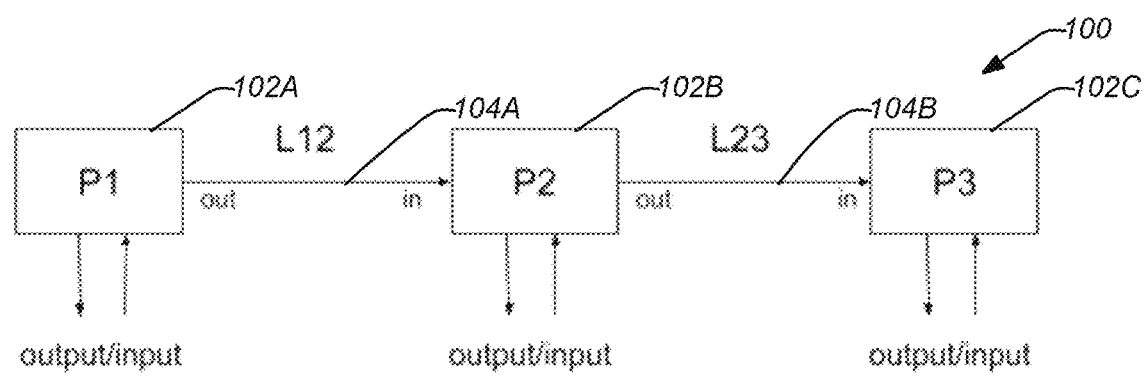
FIG. 3 is a block diagram showing unidirectional data flowing left to right.

In the synchronized mode, each link 104A, 104B between nodes is unidirectional, i.e. data flows in one direction only. For example, in FIG. 3, data flows from left to right, with three nodes P1 102A, P2 102B, and P3 102C. Link L12 104A is an outgoing link 104A at P1 102A and an incoming link 104A at P2 102B. In the same way, L23 104B is an outgoing link 104B at P2 102B and an incoming link 104B at P3 102C.

The following is a description of an example composite musical performance. Those skilled in the art will appreciate that the same process can be extended to include a composite video performance as well.

3.1 Mixing Synchronized Audio

The first player 102A plays a first performance (audio and/or video) alone, which is the only input to node P1 102A and streamed from node P1 102A. This first audio is streamed on link L12 104A to node P2, where it is presented to the second player 102B. The second player 102B adds a second performance as input to node P2 102B. Note that this second performance is automatically synchronized with the first performance of the first player 102A, since the second player 102B is "playing along" with the first performance being played back at P2. The combination of these two performances is then streamed on link L23 104B to the third player 102C, where it is played back together to the third player 102C as output. The third player 102C adds a third performance as input to node P3 102C. Note that this third performance is also automatically synchronized with the first and second performances of the first and second players 102A, 102B, since the third player 102C is "playing along" with the combination of first two performances being played back at node P3 102C. In this way, as the audio is passed from node to node, each player adds their performance in turn, and a mix of the performances of all the players is assembled one part at a time.

At the end of the chain, the complete mix is available at the last node and can be processed, for example, it can be sent to a streaming platform, distributed to multiple audience members, and/or recorded. The overall process can be envisioned as a series of sequential overdubs, each one taking the mix from the previous node as its "backing track." It can also be summarized as a left-associated addition, where the Final Mix=((P1+P2)+P3) . . . . Generally, the mix can be expressed as $P(k)=(((P(1)+P(2))+P(3))+ \ldots P(k-1))$, with the last node in the chain, P(n) comprising the final mix.

Note that, alternately, the separate performances P1 through Pn can also be passed separately along the chain, allowing a final mix to be made independently from all the performances, along with the incremental mixing being made at each node. This is described later in the section "Multi Channel Connections." Further note that, while there is a time lag delivering the sound from P1 to P2, and P2 to P3, the individual mixes are always automatically synchronized at every node. The player at each node hears only the evolving mix, along with their own performance. The mix can be produced in at least two ways: in-app and open air.

3.1.1 In-App Mixing

Figure 4:
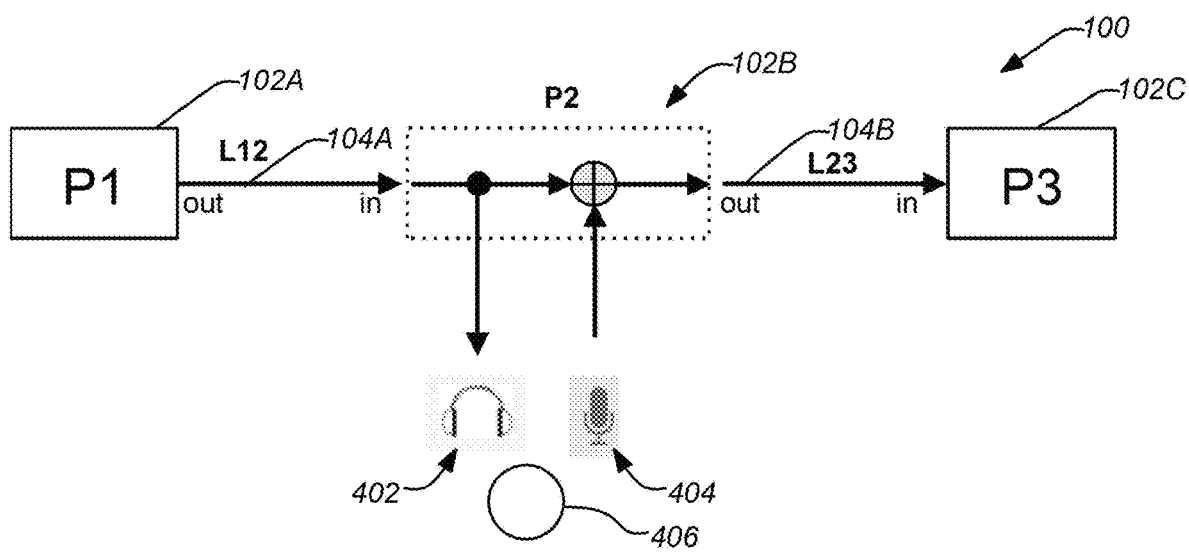
FIG. 4 shows an example of detail at one of the nodes with the interconnections between the output, the input, and the incoming and outgoing link connections at node P2.

FIG. 4 shows an example of detail at one of the nodes with the interconnections between the output 402 (shown here as a headphone), the input 404 (a microphone), and the incoming and outgoing link connections at node P2 102B. The black circle indicates a split in the signal of the stream from the immediate predecessor node, sending it in two directions, to speaker/headphones 402 for the performer 406 to hear and to be mixed with the current performance input through the microphone 404 to capture vocals and/or music played by the performer 406. The circle with the plus represents the mixing of the incoming signals, the signal from the immediate predecessor node and the current performance. The elements and terminology is applicable to all nodes of all figures and embodiments described herein.

When using in-app mixing the player can wear headphones 402, to avoid mixing the incoming audio twice (feedback): once directly from the incoming link L12 104A, and again from the microphone 404 picking up the same stream being output to the speaker from the immediate predecessor node.

The incoming audio from P1 102A, the immediate predecessor node (on link L12 104A) is played back through the headphones 402. The performer 406 at P2 102B hears the audio and plays his contributed current performance along with it. The microphone 404 picks up this audio of the current performance. The two audio streams are then mixed together and sent combined together to P3 (on the outgoing link L23 104B).

The combined mix of the performances from P1 and P2 has very low latency. It will only be affected by the sound paths within that node, to the respective speaker and from the respective microphone of each node. A method to ameliorate that latency is described below in the section "Accounting for Mixing Latency." The transmission time from P1 to P2 does not contribute any additional latency to the mix because the performer at any particular node is only aware of the performance from the immediate predecessor node as it is played back; even if transmission over the link to the node took had a long delay, the performer would have no knowledge of this and simply play along in time with the played back performance.

3.1.1.1 Accounting for Mixing Latency

Figure 5:
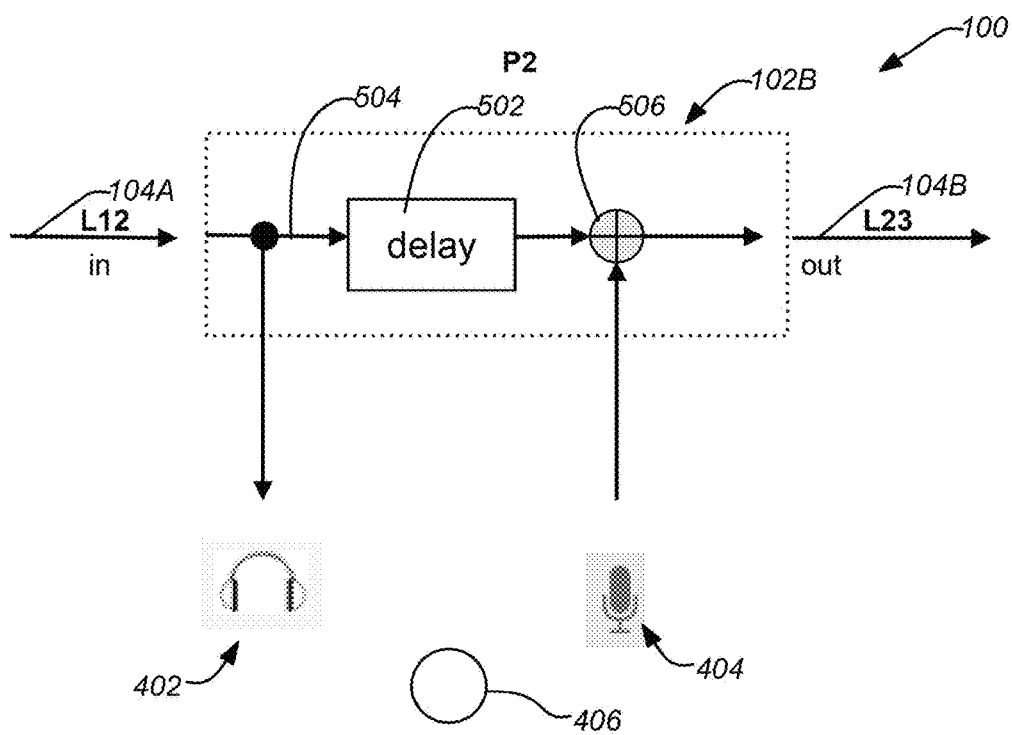
FIG. 5 illustrates an exemplary delay filter in the processing chain.

FIG. 5 illustrates an exemplary delay filter in the processing chain. An adjustable delay line 502 can be inserted between the incoming audio signal 504 and the microphone mixing point 506. The delay can be adjusted to account for any latency in the speaker/microphone signal path for the local performer 406. The delay time can be automatically determined by sending a test signal out of the speaker and measuring the time interval from the signal out to the signal coming back from the microphone 404.

3.1.1.2 Input Monitoring

Figure 6:
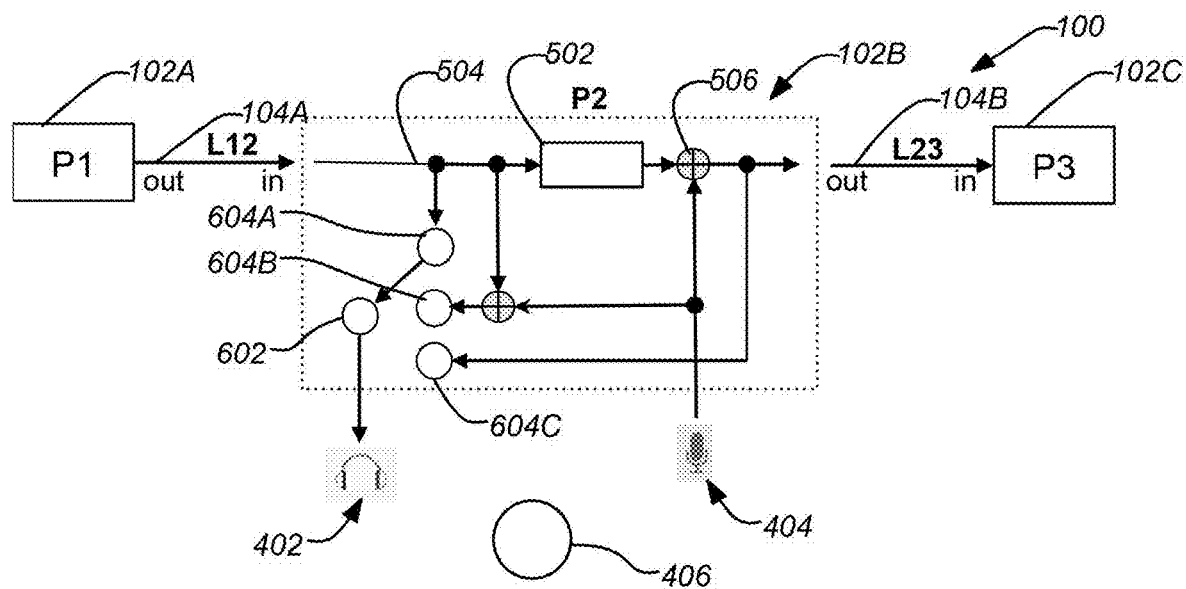
FIG. 6 shows an exemplary input monitoring at a node.

FIG. 6 shows an exemplary input monitoring at a node. There are three possible signals that can be sent to the output 402 for the player to monitor as they perform. The output node 602 connects audio to the output 402 (headphones/speakers). The monitor nodes 604A, 604B, 604C can be alternately connected to output node 602 to provide different monitoring options; only one of monitor nodes 604A, 604B, 604C can be connected to output node 602 at a time.

The "pre-mix" configuration connects the signal at monitor node 604A to output node 602. This is the incoming signal from the immediate predecessor node, the typical option. This configuration is useful for singers and players with acoustic instruments, who can hear what they are playing while they listen to the incoming audio.

The "input-monitor" configuration connects the signal at monitor node 604B to output node 602. This connection provides the sum (using another mixing point) of the incoming signal from the immediate predecessor node and the input coming from the player's instrument (from the input 404). This configuration is useful when the player 406 is using an electric instrument, such as an electric guitar, which requires an amplifier to be heard. The player 406 needs the ability to hear their own sound as well as the incoming audio with which they are playing. In this case, the input 404 may be an amplified instrument signal rather than input from a microphone. Note, the microphone symbol of the figures is intended to represent all types of possible player performance inputs, e.g. microphone input, unamplified or amplified instrument signals, or any other type of performance input that can be carried as an electrical signal.

The "post-mix" configuration connects the signal at monitor node 604C to output node 602. This option employs the outgoing signal being sent to the next node for monitoring by the player 406. In the case, if this is the final node, this signal is the final mix. This configuration also provides a way to route the mix to other audio software and/or equipment. For example, to other signal processing devices (such as reverb or compression), or to a streaming platform for broadcast to an audience. The player 406 can also listen to the post-mix output while performing using this option.

3.1.2 Open Air Mixing

Figure 7:
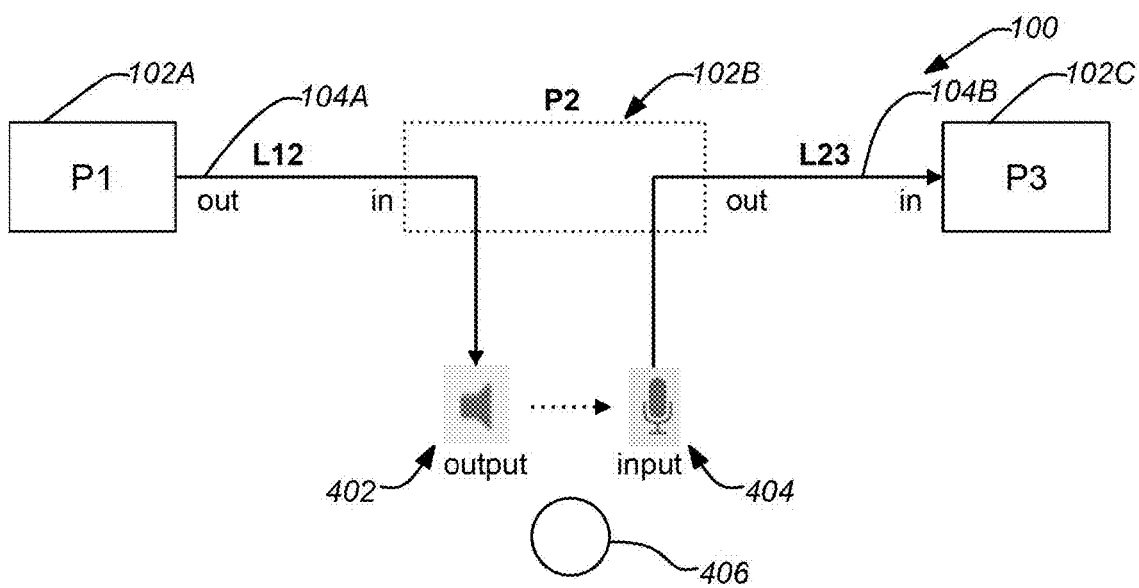
FIG. 7 shows an exemplary system used with open air mixing.

FIG. 7 shows an exemplary system used in open air mixing. Where a speaker 402 and microphone 404 are close together, a player 406 can perform an "open air" mix. In this case, the microphone 404 picks up the audio from the speaker 402 (along with the player's performance) "over the air." Note, the speaker or headphones symbols of the figures are intended to represent all types of possible audio with which the player can perform, e.g. headphones or speakers, or any other type of audio device which the player can hear and accompany.

The quality of open-air mixing can be reduced compared to in-app mixing because of the conversion of the incoming signal from digital to analog and back to digital again, along with distortions from the speaker response, open air travel, and the microphone response. Open air mixing can be useful as a fallback option in some circumstances, such as when the player 406 does not have headphones, or the latency from bluetooth or USB input/output peripherals causes problems.

4. Multi Channel Connections

As previously mentioned, rather than mixing each player's performance together, the media stream passed between nodes can be multi-channel, with one or more channels reserved for each player. In that case rather than mixing, each player's audio can be placed into their assigned channels. The node can implement a multi-channel mixer so each player can set their own mix levels for the channels they receive. The levels of the final mixdown can be set at the last node.

5. Sharing an Audio Mix with an Audience

Figure 8:
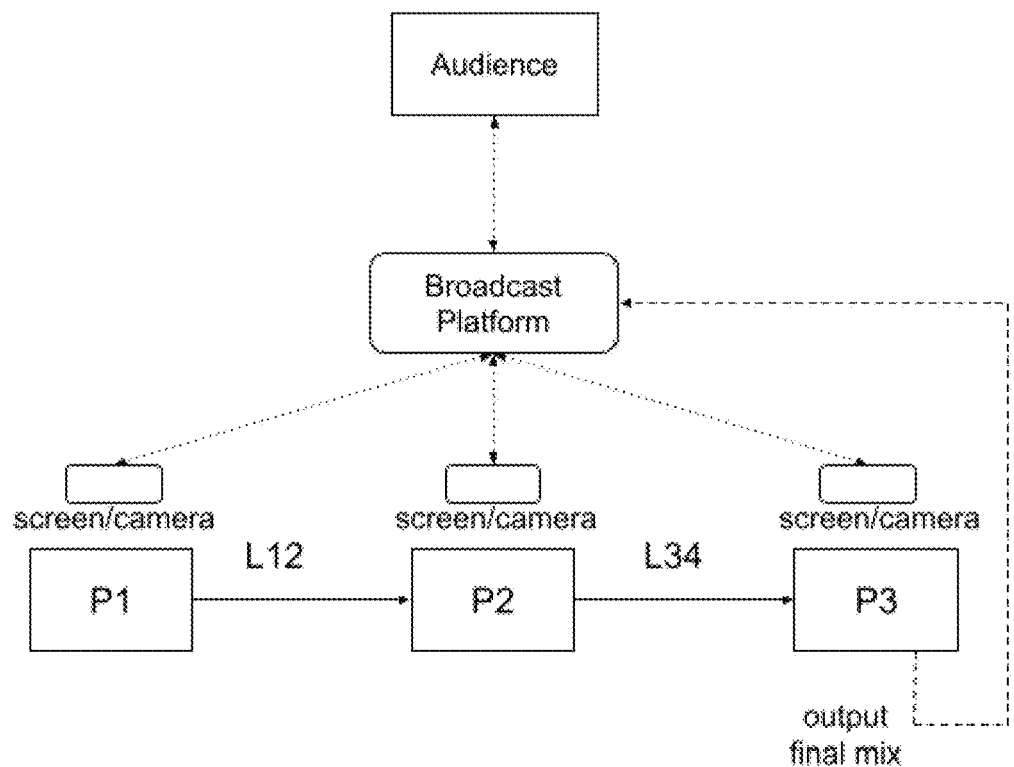
FIG. 8 shows an exemplary system for sharing a performance with an audience.

FIG. 8 shows an exemplary system for sharing a performance with an audience. The serial audio or media streams are shared only between the players at nodes as previously described. However, the final mix of the chain can be fed into an audio/video conferencing system, such as Zoom or Google Meet, where it can be shared with an audience.

Sending the mix to a live streaming service such as YouTube Live or Twitch can potentially reach an even larger audience. This option can be especially useful for established bands that want to perform in a socially distanced way.

In addition, if the streaming platform includes video, the players can connect to the platform using a separate app and broadcast their individual video streams to the streaming/conference session, so the audience can watch them all playing and the players can also view the audience. However, the images sent to the platform from each player may not be synchronized with the final mix. The players and audience can mute their streaming/conference audio input, so as not to interfere with the final mix when it is broadcast through the streaming platform.

FIG. 8 overlays screens and camera for each node of previously described performance system which are used by the applicable streaming platform hosting broadcast of the final performance mix to the audience. In FIG. 8 the solid lines represent the audio mix path from the chain, the dashed line is the final mix, and the dotted lines represent the audio/video connections to the broadcast streaming platform.

6. Mixing Synchronized Video

If the communication links between players include video data, it is possible to incorporate a simultaneous video mix that is synchronized along with the sound. In this case, computing devices at each node also include video data input and processing functions in order to receive, combine and transmit the video data. In general, video signal data for embodiments of the invention comprise a composite video image of a plurality of separate video images, one for each node providing a video signal, presented in a grid format of the separate video images. The grid format can comprise any number of separate optimized to best fit on a video screen. For example, 1 to 4 nodes would be presented in a 2 by 2 grid pattern, whereas 5 to 9 nodes would be presented in a 3 by 3 grid pattern, and 10 to 16 would be presented in a 4 by 4 grid pattern and so on. Grid areas may be left blank if there are not enough separate video signals.

Sending video is somewhat analogous to sending audio across the chain. However, mixing audio is often just a weighted sample addition, in which corresponding samples from stream $A(i)$ and stream $B(i)$ are simply added together (i.e. overlayed) with weights a and b, as in $(C(i)=a*A(i)+b*B(ii)$. However, the video analogy is not perfect because weighted and overlayed images of separate performers will quickly become noise to a viewer. Accommodating the imperfect analogy only requires the addition of a composite video grid to isolate the separate video from each performer's node.

Figure 9:
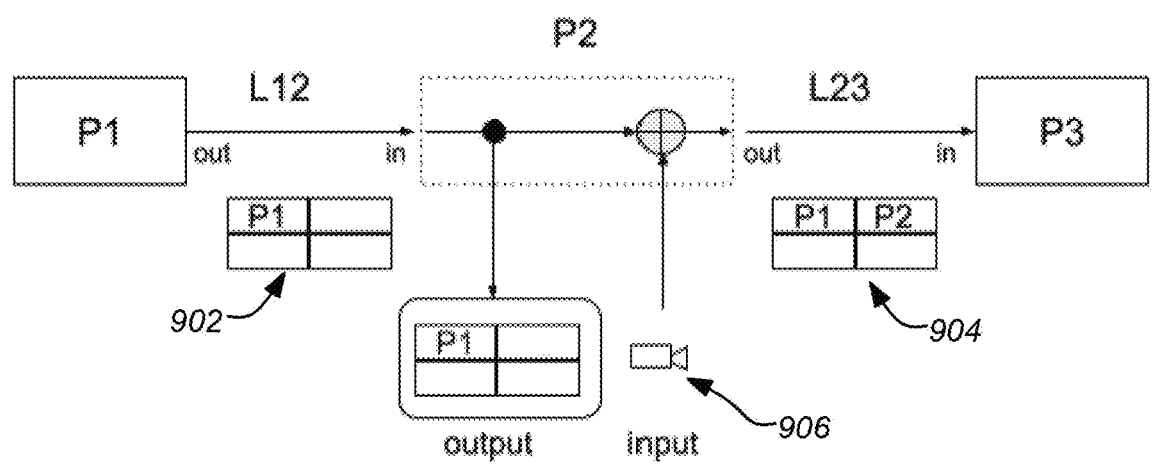
FIG. 9 shows an exemplary 4×4 video grid before and after a node mixes its camera input into the grid.

Instead, video images can be mixed together using a sub-view approach where the final video image is subdivided into a grid, with placeholder cells assigned for each player. The cells are initially empty. Each player renders their camera image onto their designated cell and sends the full image to the next player. At the end of the chain, all of the players' video feeds occupy their assigned cells and are synchronized with the audio that was created the same time as the image. The result is a grid view of all the players FIG. 9 shows an exemplary 4×4 video grid before and after node P2 mixes its camera input into the grid. The output video grid 902 is video data that is part of the streamed data of the communication streams between the nodes along with the audio data. Node P2's output screen (from the immediate predecessor node) renders a grid 902 that displays the non-empty cells from the incoming link. The local image from P2's camera is added to the grid 902 to result in the composite video grid 904 including both the original grid 902 with the video image from P2's camera 906 added in the appropriate location in the grid which is transmitted on to the next node.

As with audio, there may be some delay in processing the video images coming from the immediate predecessor node before they can be mixed into the outgoing stream. An additional delay line can be inserted between the incoming video signal and the camera mixing point. The delay can be adjusted to account for any latency in the video signal path.

6.1 Sharing a Video Mix with an Audience

Figure 10:
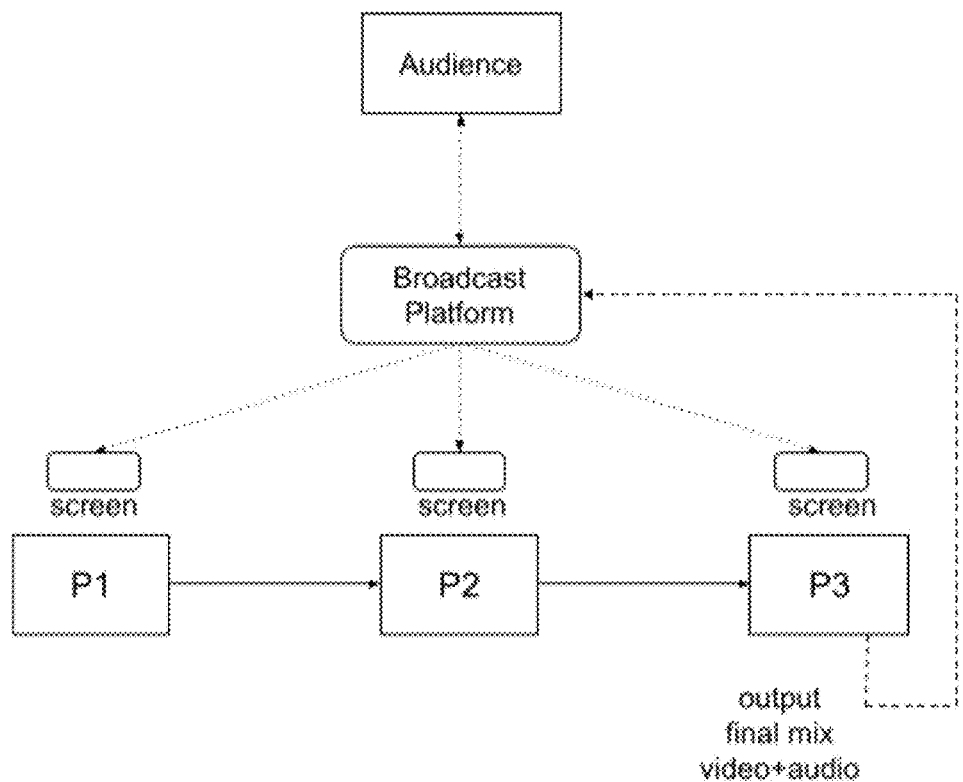
FIG. 10 shows an exemplary system for sharing a performance with an audience including a video data as part of the final mix.

FIG. 10 shows an exemplary system for sharing a performance with an audience including a video data as part of the final mix. When the chain is used to produce a video mix, the mix can be shared with an audience on a streaming platform or conference system as previously described in FIG. 8. However, in this case, the players have the option to receive video from the broadcast platform, in order to view their audience, but they should not send video to the platform, since their synchronized video images are already included in the final mix as described in FIG. 9. Players can view the audience using a separate app, with their cameras muted.

In FIG. 10 the solid lines represent the audio/video mix path on the chain, the dashed line is the final video mix, and the dotted lines represent the audio/video connections to the broadcast platform. Note that the players are only receiving video from the platform, they are not sending video.

7. Unsynchronized Mode

In the unsynchronized mode the chain can be used for two-way communication between all the players. In this case, the link between each pair of nodes can be bi-directional, or each pair of nodes can be connected by two unidirectional links, one in each direction. In either case, the audio from the player's microphone is mixed with the audio from the previous player and sent to the next player in the chain, and the audio is also mixed with the audio coming from the next player and sent backwards to the previous player.

Figure 11:
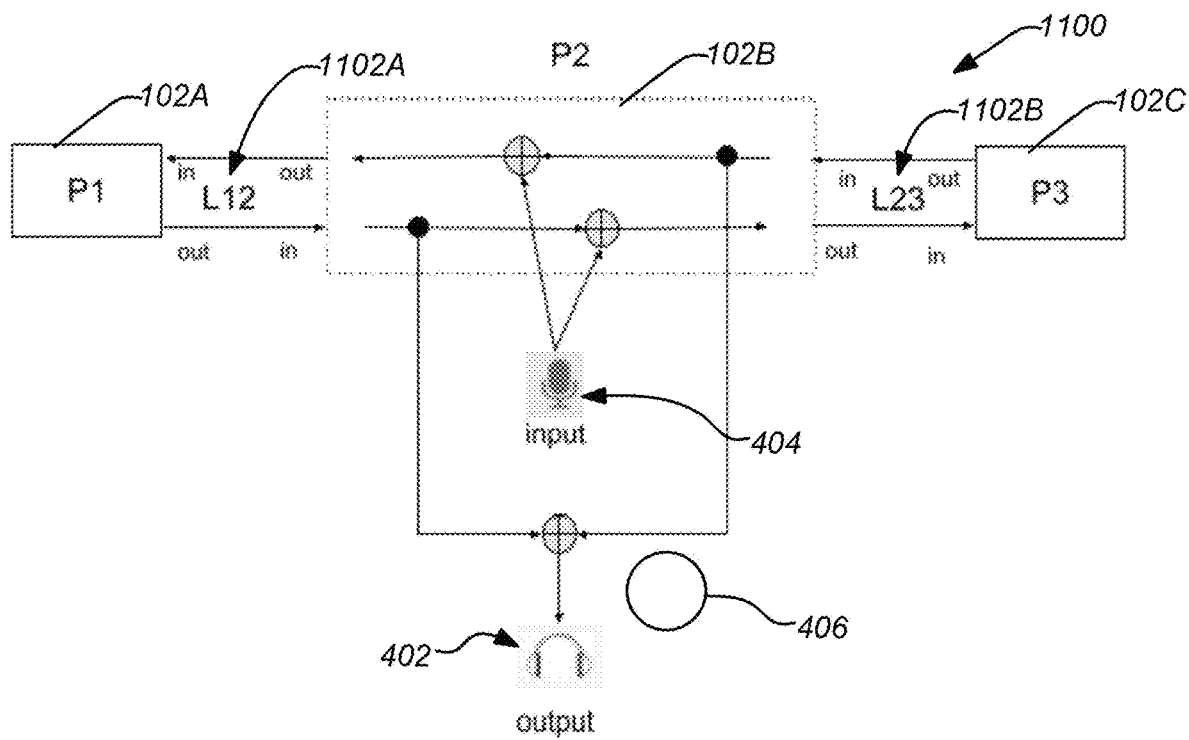
FIG. 11 shows an exemplary system in an unsynchronized mode implemented with bi-directional links.

FIG. 11 shows an exemplary system 1100 in an unsynchronized mode implemented with bi-directional links 1102A, 1102B. The two directions in each link 1102A, 1102B are shown as separate arrows for clarity. The microphone input 404 is added to the incoming audio from link L12 1102A and sent to the outgoing audio on link L23 1102B. Similarly, the microphone input 404 is added to the incoming audio from link L23 1102B and sent to the outgoing audio on link L12 1102A.

Figure 12:
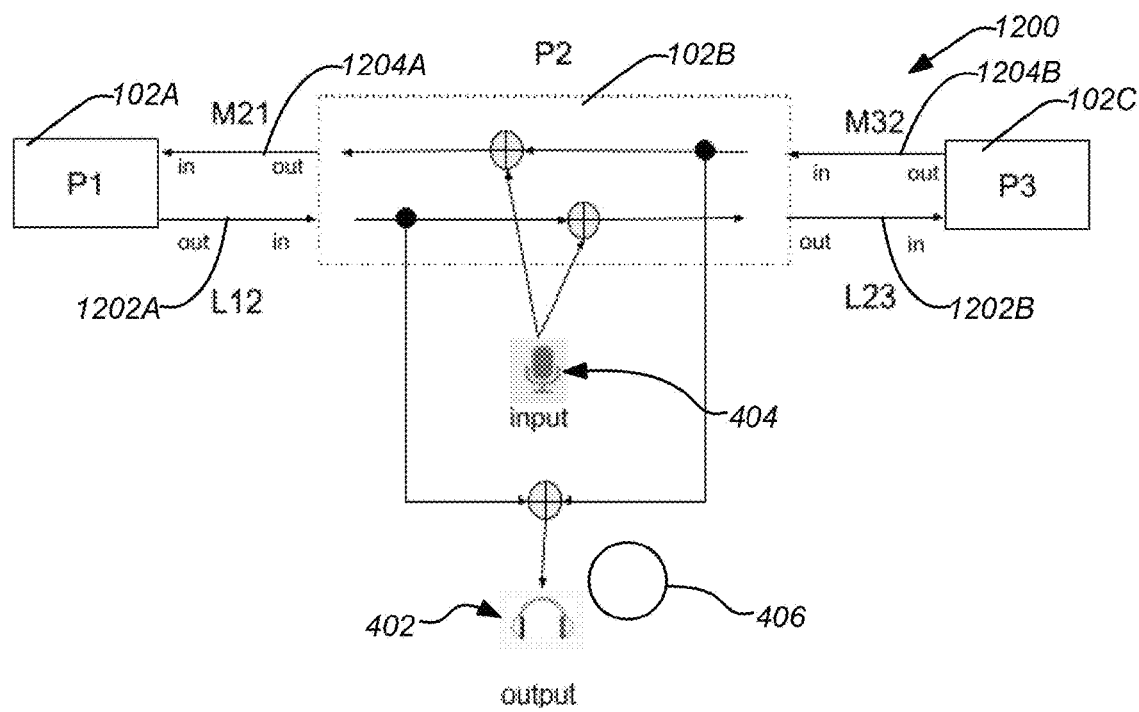
FIG. 12 shows an exemplary system in an unsynchronized mode implemented with unidirectional links.

FIG. 12 shows an exemplary system 1200 in an unsynchronized mode implemented with unidirectional links 1202A, 1202B, 1204A, 1204B. When using unidirectional links the mixing paths are the same. However, instead of transmitting the audio along the two paths as with bi-directional links, a separate pair of unidirectional links M21 1204A and M32 1204B must be connected to each pair of nodes.

Figure 13:
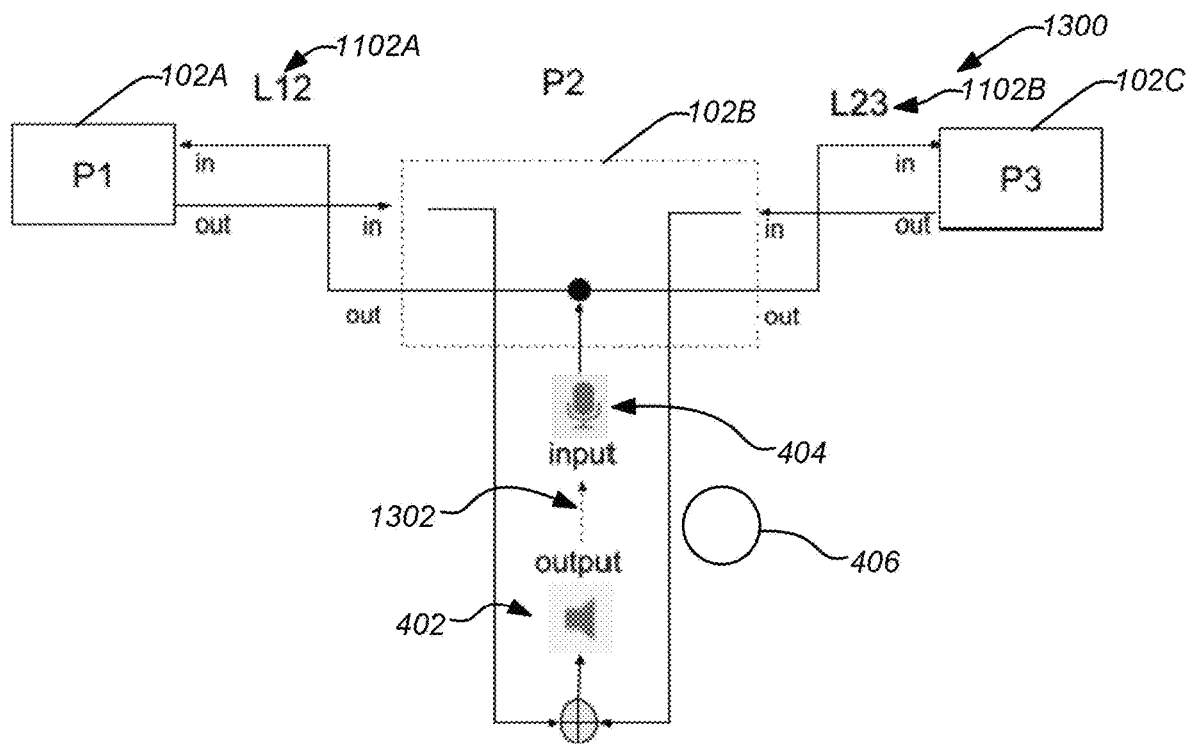
FIG. 13 shows an exemplary system in an unsynchronized mode using open air mixing implemented with bi-directional links.

It is possible to use open air mixing in the unsynchronized mode. This can be accomplished with bi-directional links between nodes. The links can employ echo cancellation to avoid feedback. FIG. 13 shows an exemplary system 1300 in an unsynchronized mode using open air mixing implemented with bi-directional links 1102A, 1102B. The incoming and outgoing paths in each link 1102A, 1102B are shown separately for clarity. The incoming streams from L12 and L23 are mixed together and sent to the speaker 404. The microphone 404 picks up speaker output 1302 and the signal from the player 406 as well, and sends that separately to the outgoing sides of links L12 and L23. If the bi-directional link 1102A, 1102B has an echo-cancel option available, it can be enabled to reduce the effect of feeding back the same signal.

8. Mixing Unsynchronized Video

Just as it is possible to pass video and audio between players and mix the images in synchrony, as previously shown in FIG. 9, in the unsynchronized mode video and audio can be mixed between the nodes in both directions in the same way that audio is mixed as previously shown in FIG. 11.

Figure 14:
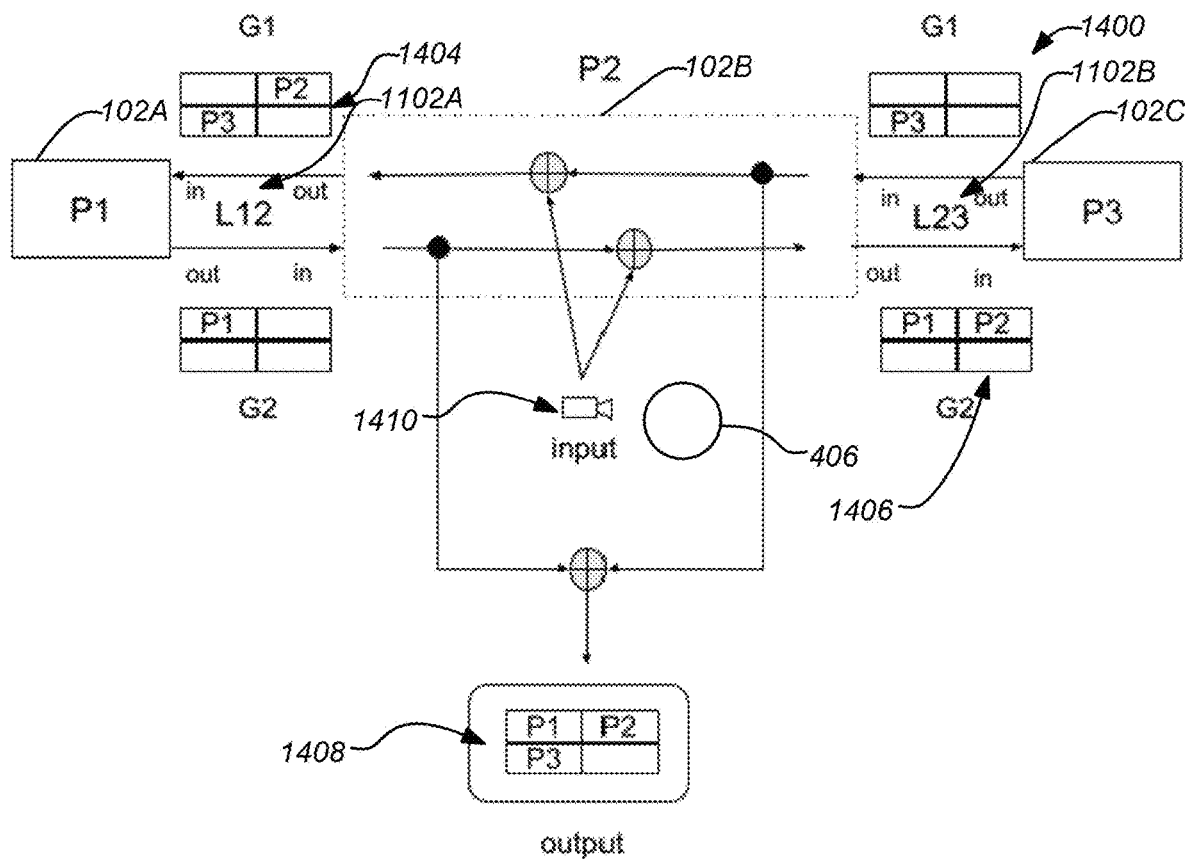
FIG. 14 shows an exemplary system in an unsynchronized mode mixing video employing bidirectional links.

FIG. 14 shows an exemplary system 1400 mixing unsynchronized video employing bidirectional links 1402A, 1402B. In this case, there are two subdivided grids, G1 1404 and G2 1406, one for each link direction. The right-to-left path shows P3 placing their image into G1 1404 and sending the grid 1404 to P2, where P2 adds their image to their pre-assigned cell and passes the grid 1404 to P1. Conversely, the left-to-right path shows P1 placing their image into G2 1406 and sending the grid 1406 to P2, where P2 adds their image to their pre-assigned cell and passes the grid 1406 to P3. While the two grids 1404, 1406 are kept separate, P2's output screen renders a third grid 1408 that displays the non-empty cells from G1 1404 and G2 1406 plus the local image from P2's camera 1410.

9. Paused Mode

In paused mode, optionally engaged by each node, data does not flow into or out of a node. While in paused mode players can take advantage of the record and playback capabilities (described below in the section "Record and Playback") to rehearse with a backing track, make new local recordings, or review previously recorded performances, for example.

10. Additional Enhancements

Various optional features and other aspects can be applied to embodiments of the invention as described hereafter.

10.1 Metering/Level Controls

Each node can provide level meters and gain controls for the signals from the incoming audio link, the microphone input, and the level of the playback file, if any (described below in the section "Record and Playback"). For example, if P2 is playing a loud instrument, like a trumpet, and the next player P3 is playing a softer instrument, like a harp, it can be easier for P3 to simply turn down the gain they are receiving from P2 rather than requesting the P2 to play softer.

10.2 Inter-Node Communication and Control

Figure 15:
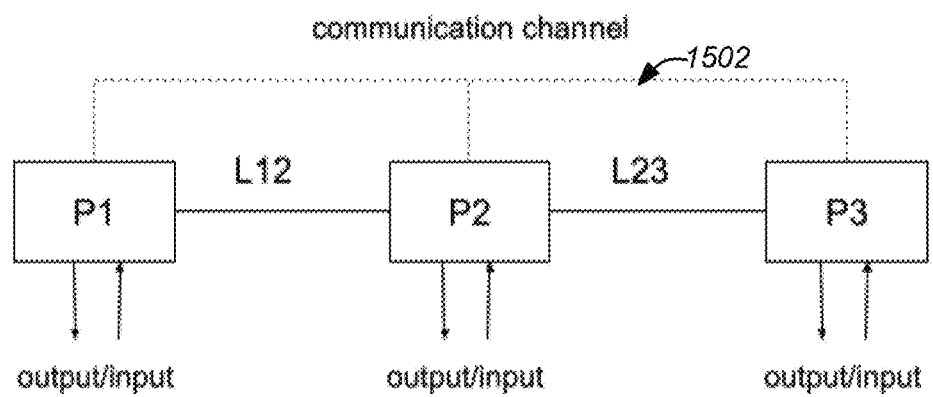
FIG. 15 illustrates a separate communication channel across nodes for use with embodiments of the invention.

FIG. 15 illustrates a separate communication channel 1502 across nodes for use with embodiments of the invention. The communication channel 1502 can comprise a separate channel, e.g. secure VPN or other suitable communication link, via the internet shared by the nodes. The channel 1502 allows nodes to pass control information to each other. For example, one node can adjust the levels of the incoming link and input at another node. This makes it possible, for example, for the player at the last node in a chain to monitor the mix and control the levels of each player to achieve a good balance. In FIG. 15 the communication channel 1502 between nodes is represented by the dotted lines. This communication channel 1502 can be implemented with any of the embodiments of the invention described herein as will be understood by those skilled in the art.

10.3 Passthru

The mixing behavior at each node can be bypassed, passing the data of the incoming link (audio and/or video) directly to the outgoing link. In this way, a player can temporarily "drop out" of the chain without actually removing themselves from the system session. For example, during a long session, one or more players may not be needed to rehearse a tricky passage or have a part to play in a particular piece. By setting their node to passthru, they can stop participating in the session, but easily rejoin when they are needed again. Passthru can be implemented with the option to continue monitoring the node's output, or mute the output.

10.4 Soft limiter

Figure 16:
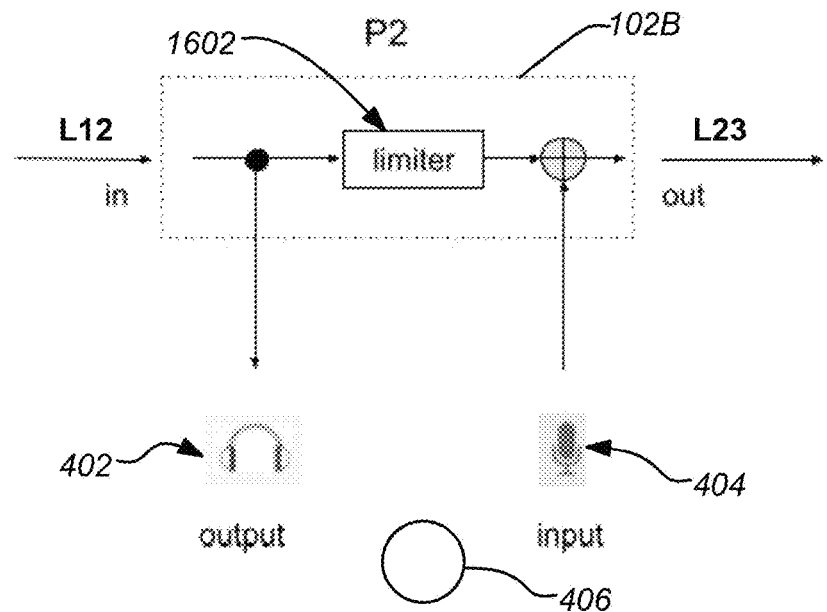
FIG. 16 shows the placement of a soft limiter in the processing chain.

Each node can implement a soft limiter algorithm to gently attenuate the level of the outgoing signal when it becomes too "hot" which could result in distortion of the sound when played back. For example, if players in the chain begin to play so loud that the signal begins to clip, a limiter can lower the gain to avoid saturation. FIG. 16 shows the placement of a soft limiter 1602 in the processing chain. Note that the soft limiter 1602 operates on the incoming signal from the immediate predecessor node prior to addition of the performance at the current node.

10.5 Record and Playback

Each node can also make a recording of the mix at that node before it is passed to the outgoing link. Being able to record at the last node makes it very easy to capture a session, whether the session is an informal jam, a rehearsal, or a live performance. The combination of playing back and recording is a powerful tool for music education. A student player can make a live recording while playing along with their teacher, and afterwards the two of them can listen to the recording and discuss the performance.

Figure 17:
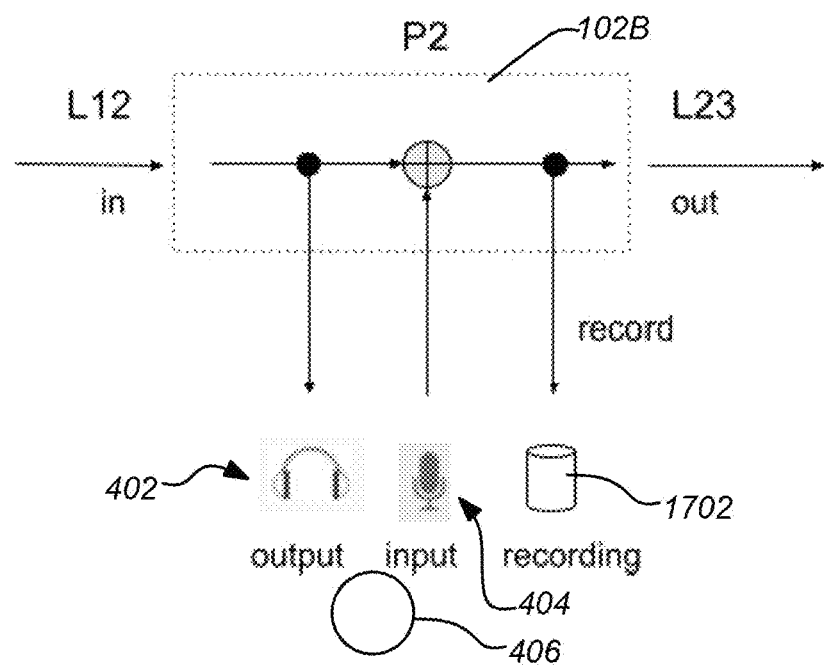
FIG. 17 shows the placement of a recording memory system inside a node.

The recording can be held in memory or saved on the computing device of the local node. FIG. 17 shows the placement of a recording memory system 1702 inside a node. The recording memory system 1702 can be implemented as a software function within the computing device of the local node operating the performance system. For example, the recording can be saved to dynamic memory, to a storage device such as a disk or flash memory, or uploaded to a cloud-based server. Alternately, the recording memory system 1702 could be a separate hardware recording system patched into the outgoing audio signal.

The computing device of each node of the performance system can playback audio from a local file or from memory. The playback signal can be sent locally only to the player's speaker, or mixed with the incoming data stream that is presented to the player.

Figure 18:
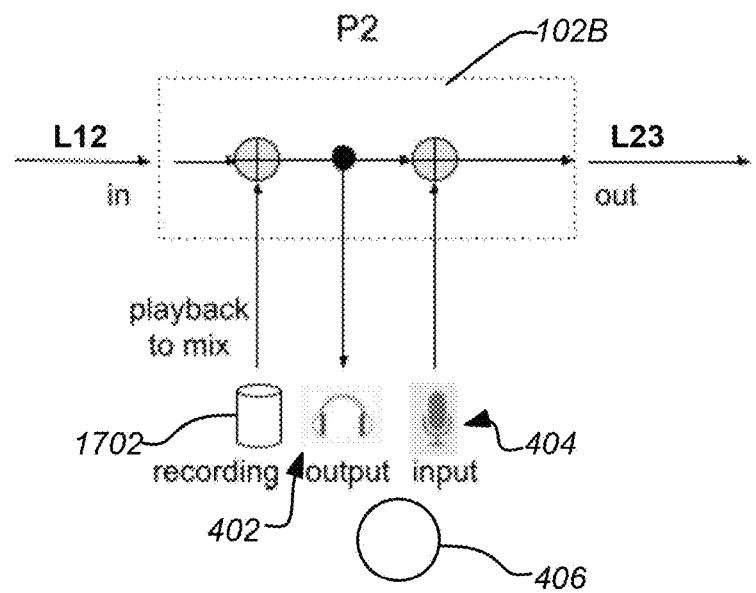
FIG. 18 shows the playback path of a recording for mixing with the incoming stream.

FIG. 18 shows a playback path of a recording from a recording memory system 1702 for mixing with the incoming stream audio data before the combined played back recording and incoming audio are played to the player 406. This lets the player 406 play along with the recording and also sends it down the chain which can help the other players keep together with the music.

Figure 19:
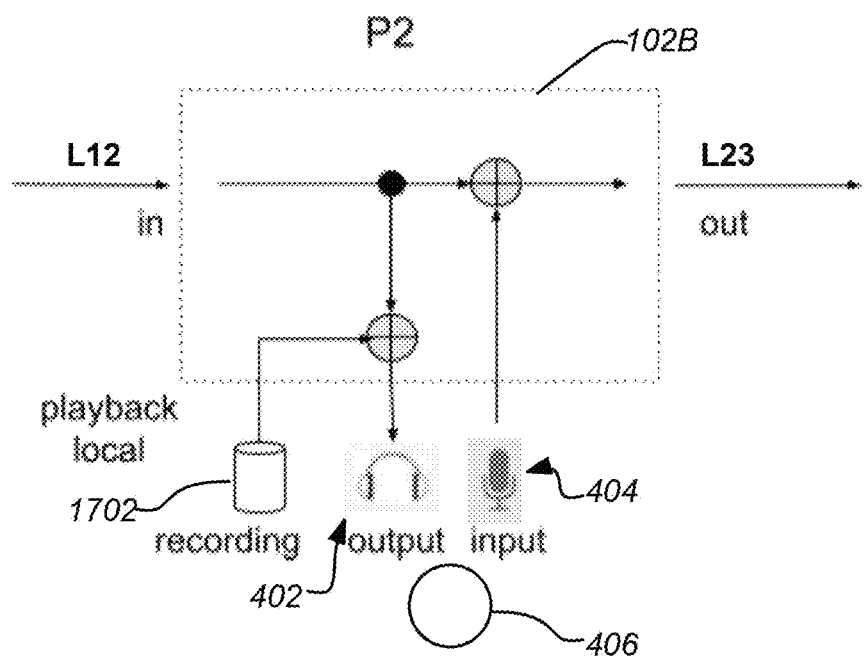
FIG. 19 shows a local playback path of recording from a recording memory system.

FIG. 19 shows a local playback path of recording from a recording memory system 1702. Here the played back recording is patched only into the audio direct the local speakers/headphones output 402. This arrangement gives the player 406 the option to listen to their own "backing track" locally, without sending it to the rest of the ensemble at other nodes. The approach will conflict with an open air mixing.

10.6 Audio Notifications

When playing in synchronized mode it can be useful to communicate brief messages to players, such as "slow down," "play softer," "take another chorus," or "stop." Such information can be communicated by using pre-recorded voice snippets of the various messages, or abstract melodic/harmonic audio clips, for example. The notifications can be triggered from any player's node computing device, using the keyboard or mouse, for example, and played into everyone's headphone, or a specific player's headphone. However, the pre-recorded messages are not added to the synchronized mix passed along the chain. Embodiments of the invention can employ a collection of pre-recorded messages, as well as allowing users to record their own messages and assign them to any user interface control.

10.7 Managing the Chain of Nodes

The configuration of the chain of the performance system can be managed by various functions. One function allows players nodes to be added and/or deleted. Another function allows the order of players' nodes to be changed. Yet another function allows the chain configuration (players' nodes and their order) to be saved and restored.

10.8 Software Implementation

Nodes can be implemented using hardware, software, or any combination of hardware and software as will be understood by those skilled in the art. Similarly, nodes can be implemented as a stand-alone computer program, or as a web-based application running in a web browser.

A node may communicate using a network. The network can include a local-area network (LAN), such as a company Intranet, a metropolitan area network (MAN), or a wide area network (WAN), such as the Internet or the World Wide Web. In some embodiments, there can be multiple networks between nodes. In one of these embodiments, the network can be a public network, a private network, or can include combinations of public and private networks. Those skilled in the art will appreciate that connection between the nodes can be implemented through any suitable combination of public and/or private networking systems.

The network can be any type or form of network and can include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network or any other suitable known network system type. In some embodiments, the network can include a wireless link, such as an infrared channel or satellite band. The topology of the network can include a bus, star, or ring network topology. The network can include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some embodiments, different types of data can be transmitted via different protocols. In other embodiments, the same types of data can be transmitted via different protocols.

A single node of the performance system can comprise multiple units that do not need to be physically proximate to each other or in the same machine farm. Thus, the units logically grouped as a machine farm can be interconnected using a wide-area network (WAN) connection or a metropolitan-area network (MAN) connection. For example, a machine farm can include units physically located in different continents or different regions of a continent, country, state, city, campus, or room. Data transmission speeds between units in the machine farm can be increased if the units are connected using a local-area network (LAN) connection or some form of direct connection.

Management of the nodes of the performance system can be decentralized. For example, one or more management machines can comprise components, subsystems and circuits to support one or more management services. In one of these embodiments, one or more management machines can provide functionality for management of dynamic data, including techniques for handling failover, data replication, and increasing robustness. Each node of the performance system can communicate with a persistent store and, in some embodiments, with a dynamic store.

A node of the performance system can include a file server, application server, web server, proxy server, appliance, network appliance, gateway, gateway, gateway server, virtualization server, deployment server, secure sockets layer virtual private network ("SSL VPN") server, or firewall. In one embodiment, the node of the performance system can be referenced as a remote machine or a server. In one embodiment, the node can be referenced as a cloud.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention can be devised without departing from the inventive concept as set forth in the following claims.

What is claimed is:

1. A system for producing a live performance combining separate performances of remote players, comprising:
   a plurality of connected computing devices each comprising a processor and each transmitting a communication stream to one another in series including:
   a first computing device for capturing a first performance and for transmitting a first communication stream including the first performance; and
   a plurality of successor computing devices, each for receiving and playing back an immediate predecessor communication stream received from an immediate predecessor computing device, and each for capturing a current performance mixed with the played back immediate predecessor communication stream to synchronize the current performance and the immediate predecessor communication stream and transmitting a mix of the current performance and the played back immediate predecessor communication stream over the communication stream to a next one of the plurality of successor computing devices;
   wherein a first one of the plurality of successor computing devices receives the first communication stream from the first computing device as the immediate predecessor communication stream;
   wherein the plurality of connected computing devices are remotely located from one another, wherein no timing data is transmitted with the mix for each of the plurality of computing devices over the communication stream and wherein the played back immediate predecessor performance is delayed before the mixing of the current performance and the played back immediate predecessor performance for each of the plurality of successor computing devices.

2. The system of claim 1, wherein a last computing device of the plurality of successor computing devices for capturing a a last performance; mixed with an immediate predecessor communication stream received from an immediate predecessor computing device in the series transmits the mix in a last communication stream to an audience.

3. The system of claim 1, wherein the immediate predecessor communication stream includes the first performance combined with any predecessor performances from any predecessor computing devices in the series of the plurality of successor computing devices.

4. The system of claim 1, wherein the immediate predecessor communication stream comprises audio of the first performance of the first computing device mixed with predecessor audio of any predecessor performances from any predecessor computing devices in the series of the plurality of successor computing devices.

5. The system of claim 4, wherein the communication stream further comprises video of at least one of the first performance of the first computing device and any predecessor performances from any predecessor computing devices in the series of the plurality of successor computing devices.

6. The system of claim 1, wherein playing back the immediate predecessor communication stream and capturing the current performance along with the played back immediate predecessor communication stream are performed simultaneously to synchronize the played back immediate predecessor communication stream and the current performance as they are mixed together.

7. The system of claim 1, wherein the plurality of connected computing devices transmitting the plurality of communication streams to one another in series are connected via one or more communication links.

8. The system of claim 7, wherein the one or more communication links each comprises a unidirectional link.

9. The system of claim 7, wherein the one or more communication links each comprises a bi-directional link.

10. The system of claim 7, wherein the one or more communication links each comprises an internet communication link.

11. The system of claim 7, wherein the mix of the current performance and the played back immediate predecessor communication stream is transmitted from a last computing device of the plurality of successor computing devices via a final communication link of the one or more of the communication links for playback to an audience.

12. The system of claim 1, wherein capturing the current performance mixed with the played back immediate predecessor communication stream comprises in-app mixing.

13. The system of claim 1, wherein the communication stream of each of the plurality of connected computing devices is transmitted including a common fixed number of channels.

14. A method of producing a live performance combining separate performances of remote players comprising:
   capturing a first performance with a first computing device comprising a first processor via a first audio input device;
   transmitting the first performance from the first computing device via a first network interface to a second computing device comprising a second processor via a first communication stream;
   receiving the first communication stream with the second computing device and playing back the first performance;
   capturing a second performance with the second computing device via a second audio input device while playing back the first performance to synchronize the second performance with the first performance;
   mixing the first performance and the second performance with the second computing device to create a first combined performance;
   transmitting the first combined performance from the second computing device to a third computing device via a second communication stream;
   receiving the second communication stream with the third computing device and playing back the first combined performance;
   capturing a third performance with the third computing device while playing back the first combined performance to synchronize the third performance with the first combined performance;
   mixing the third performance and the first combined performance with the third computing device to create a second combined performance;

delaying the first performance before the mixing of the first performance and the second performance with the second computing device to create the first combined performance; and delaying the first combined performance before the mixing of the third performance and the first combined performance with the third computing device to create the second combined performance;

wherein no timing data is transmitted with the first performance over the first communication stream and no timing data is transmitted with the first combined performance over the second communication stream.

15. The method of claim 14, wherein the first communication stream and the second communication stream are transmitted including a common fixed number of channels.

* * * * *